US005449157A

United States Patent [19]

Kawano et al.

[11] Patent Number: 5,449,157

[45] Date of Patent: Sep. 12, 1995

[54] RECORDING SHEET FINISHING APPARATUS

[75] Inventors: Minoru Kawano; Izumi Hamanaka; Mitsuru Nagoshi; Takao Shiozawa, all of Hachioji; Toshitaka Matsumoto, Asaka; Shigemi Yukizane, Chofu, all of Japan

[73] Assignee: Konica Corporation, Tokyo, Japan

[21] Appl. No.: 189,506

[22] Filed: Jan. 31, 1994

[30] Foreign Application Priority Data

Feb. 8, 1993 [JP] Japan .................................. 5-020270

[51] Int. Cl.[6] .......................... B31B 1/70; B65G 57/00

[52] U.S. Cl. .................................. 270/53; 414/790.7; 270/58

[58] Field of Search .................... 270/53, 58; 271/202; 414/790.7, 790.3

[56] References Cited

U.S. PATENT DOCUMENTS

| | | | |
|---|---|---|---|
| 4,558,942 | 12/1985 | Chiama . | |
| 4,566,782 | 1/1986 | Britt et al. . | |
| 4,611,741 | 9/1986 | Wilson | 227/99 |
| 4,917,366 | 4/1990 | Murakami et al. | 270/53 |
| 4,974,828 | 12/1990 | Matsuo et al. | 271/202 X |
| 5,072,920 | 12/1991 | Kubota et al. | 270/53 |
| 5,083,760 | 1/1992 | Yamazaki et al. | 270/58 X |
| 5,121,911 | 6/1992 | Yamazaki et al. | 270/53 |
| 5,320,336 | 6/1994 | Asami | 270/58 |

FOREIGN PATENT DOCUMENTS

| | | | |
|---|---|---|---|
| 60-142359 | 7/1985 | Japan . | |
| 60-158463 | 8/1985 | Japan . | |
| 62-239169 | 10/1987 | Japan . | |
| 62-290653 | 12/1987 | Japan . | |
| 63-310459 | 12/1988 | Japan . | |
| 0073395 | 3/1991 | Japan | 270/53 |
| 5-41991 | 6/1993 | Japan . | |
| 2248608A | 4/1992 | United Kingdom . | |
| WO92/12087 | 7/1992 | WIPO . | |

OTHER PUBLICATIONS

Patent Abstracts of Japan, vol. 015, No. 235 (M-1125) Jun. 17, 1991 & JP-A-03 073 395 (Ricoh Co., Ltd.) Mar. 28, 1991.

Patent Abstracts of Japan, vol. 012, No. 179 (M-701) May 26, 1988 & JP-A-62 290 653 (Canon Inc.) Dec. 17, 1987.

Patent Abstracts of Japan, vol. 010, No. 364 (P-524) Dec. 5, 1986 & JP-A-61 160 766 (Fuji Xerox Co., Ltd.) Jul. 21, 1986.

*Primary Examiner*—John E. Ryznic
*Attorney, Agent, or Firm*—Frishauf, Holtz, Goodman, Langer & Chick

[57] ABSTRACT

A recording sheet finishing apparatus connected with an image forming apparatus, in which recording sheets delivered from the image forming apparatus are stapled and the stapled sheets are ejected. The apparatus includes a plurality of stackers each having at least one stapler. The apparatus further includes a control means in which the recording sheets delivered from the image forming apparatus are stapled alternately by the staplers for each set of recording sheets and after that, each of the stapled set of recording sheets are delivered from the stapler to a delivery sheet tray, where a conveyor belt which transports the stack is operated at two different speeds with an initial speed followed by a faster speed to prevent damage to the stack.

2 Claims, 19 Drawing Sheets

RECORDING SHEET FINISHING APPARATUS

BACKGROUND OF THE INVENTION

The present invention relates to a recording sheet finishing apparatus for automatically conducting the stapling operation by a stapler on recording sheets, on which images are recorded by an image forming apparatus, and after stapling, the recording sheets are delivered from the finishing apparatus. Specifically, the present invention relates to a recording sheet finishing apparatus appropriate for the image forming apparatus in which high speed processing can be conducted.

A recording sheet finishing apparatus, which is called a finisher, is used for an apparatus by which a plurality of recording sheets, on which images have been recorded and which are delivered from the image forming apparatus, are collated and stapled for each copying volume.

This finisher is connected with the image forming apparatus main body in terms of function, and is driven in correspondence with sequential operations of the copying processes.

Accordingly, with respect to the image forming apparatus which can conduct the copying processes at high speed, the finisher, which can perform its function at the correspondingly high speed of the image forming apparatus, is necessary.

Concerning the finisher which can carry out the copying processes at a high speed, various proposals have been made in the following publications: Japanese Patent Publication Open to Public Inspection No. 142359/1985, No. 158463/1985, No. 239169/1987, No. 290653/1987, No. 310459/1988; and Japanese Patent Publication No. 41991/1993. In these proposals, since only one stapler is provided or only one delivery tray is provided in the finisher, the processing speed can not be greatly increased. Specifically, in the first two publications, since the function is necessary, in which a bundle of recording sheets stacked on two intermediate trays being collated, are conveyed to one stapler placed at another position, the structure becomes complicated, and additional operations are required, which are disadvantageous.

SUMMARY OF THE INVENTION

The present invention has solved and improved the foregoing disadvantages. The object of the present invention is to provide a finisher which can process the coying sheets at a high speed and can be appropriately sufficient for the image forming apparatus in which about 90 sheets can be copied per minute.

According to the first embodiment of the present invention, the forgoing object of the present invention can be accomplished with the following recording sheet finishing apparatus, which is connected to an image forming apparatus, and in which recording sheets delivered from the image forming apparatus are stapling-processed and after that, the stapled sheets are delivered from the finishing apparatus. The recording sheet finishing apparatus is provided with a plurality of stackers, and each stacker is provided with at least one stapler. The recording sheet finishing apparatus is provided with a control means in which the recording sheets delivered from the image forming apparatus are stapled alternately by the staplers for each volume of recording sheets and after that, the stapled volume of recording sheets is delivered from the stapler to a delivery sheet tray so that the stapled recording sheets are pushed back.

According to the second embodiment of the present invention, the foregoing recording sheet finishing apparatus is provided with a plurality of stackers by which the recording sheets are stapling-processed, and each stacker is provided with at least one stapler. The recording sheet finishing apparatus is further provided with a delivery means, corresponding to the stackers, by which the volume of the recording sheets stapled by the staplers is delivered, and provided with delivery trays, corresponding to the stackers, on which the recording sheets delivered by the delivery means are stacked.

According to the third embodiment of the present invention, the recording sheet finishing apparatus is provided with: a stacker on which the recording sheets delivered from the image forming apparatus are stacked; an aligning means to align various sized recording sheets perpendicular to the conveyance flow so that one end of the recording sheets are aligned with one end of the stacker which is used as the reference for aligning the recording sheets; staplers to staple the recording sheets which are stacked on the stacker and aligned by the aligning means; delivery trays to accommodate bundles of the recording sheets which are stapled by the staplers; two transfer means each of which is integrated with a stapler so as to deliver the bundle of the recording sheets from the stacker to the delivery tray; and two rotatable delivery belts which are provided with protrusions on their circumferences so as to push out the trailing end of the bundle of the recording sheets in the direction of delivery. Recording sheets of various sizes can be transferred to the delivery belts by the transfer means, and the transfer means can be moved so that the center of gravity of the recording sheets of various sizes can be placed between the two said transfer means.

Further, according to the fourth embodiment of the present invention, the recording sheet finishing apparatus comprises: delivery trays on which the recording sheets, images having been formed thereon and recording sheets having been delivered from the image forming apparatus, and stapled recording sheets are stacked; an elevation means to control the delivery tray so that the delivery tray can be moved up and down; a first sensor which is provided near the surface of the delivery tray on which the recording sheets are stacked, which detects an upward movement reference position of the delivery tray, and simultaneously detects that the recording sheets, stacked on the surface of the delivery tray, are removed during recording sheet finishing processing; and a second sensor which detects the amount of recording sheets stacked on the surface of the delivery tray.

Furthermore, according to the fifth embodiment of the present invention, the recording sheet finishing apparatus comprises: delivery belts to receive the recording sheets after stapling processing, and to convey them to the delivery trays; and an initial position detection means to detect a position of the delivery belt after the recording sheets have been delivered, and to set the belt at its initial position. The speeds of the belts are successively switched as follows: the feeding speed of the recording sheets of the belt is a low speed; the recording sheets delivery speed is a high speed; and the speed at the time of detection of the initial position of the delivery belt is also a low speed.

DETAILED DESCRIPTION OF THE PREFERRED EMBODIMENTS

Referring to the attached drawings, an example of a recording sheet finishing apparatus of the present invention will be described as follows.

Figure 1:
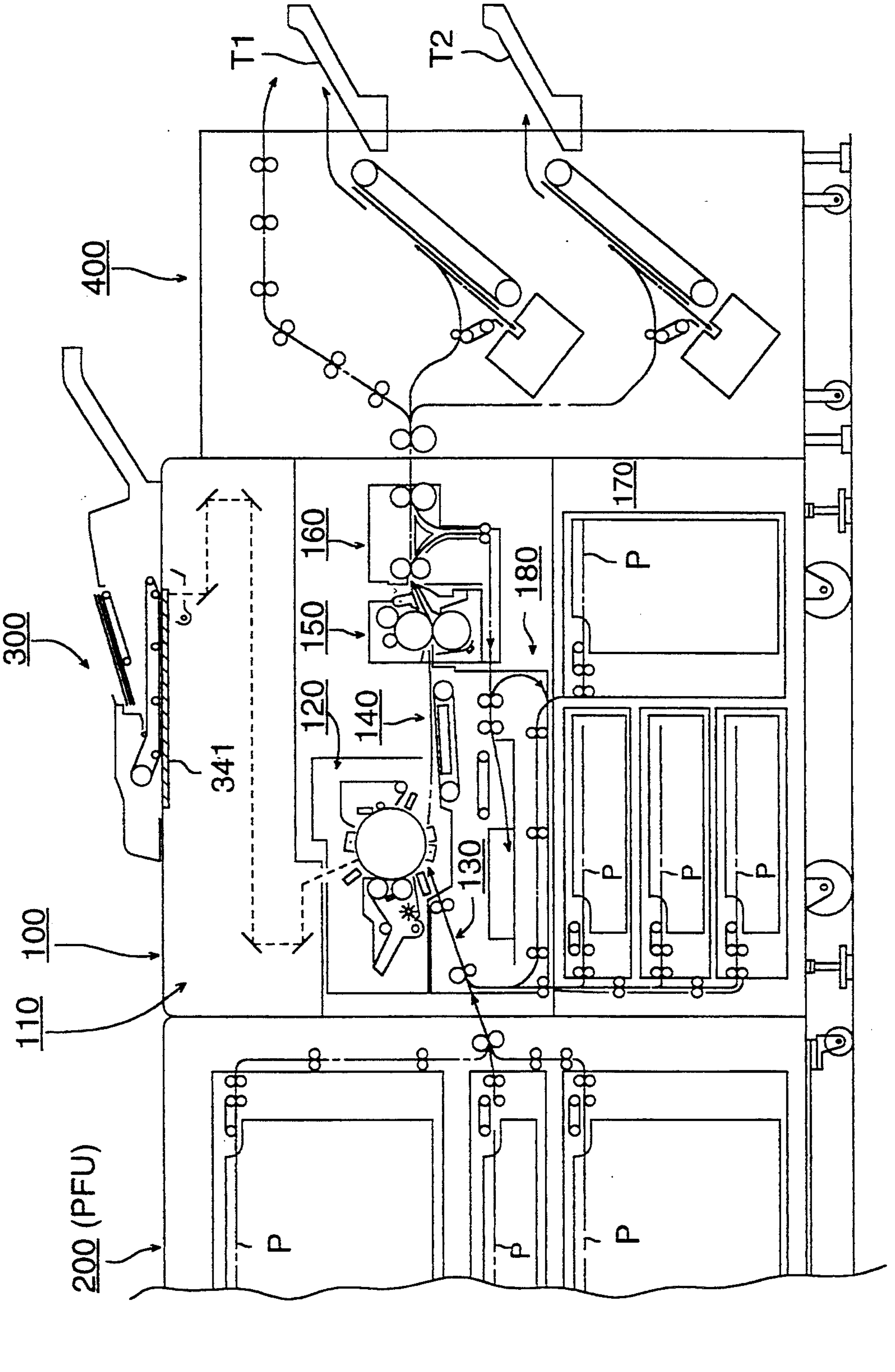
FIG. 1 is a view showing the overall structure of a copier provided with the recording sheet finishing apparatus according to the present invention.

FIG. 1 is a view showing the overall structure of a copier provided with a recording sheet finishing apparatus. Numeral 100 is a copier main body, numeral 200 is a paper feed unit (PFU unit), numeral 300 is an automatic recirculating document handler (RDH apparatus), and numeral 400 is a recording sheet finishing apparatus (a finisher, (a delivery tray with a stapler apparatus), called an FNS apparatus, hereinafter).

The copier main body 100 comprises a scanning exposure section 110, an image forming section 120, a sheet feed section 130, a conveyance section 140, a fixing section 150, a delivery sheet switching section 160, a plurality of sheet feed cassettes 170 and an automatic duplex unit (ADU device) 180.

In the drawing, a one dotted chain line shows a conveyance path of a recording sheet P. After an image has been formed on the recording sheet P, which is accommodated in a sheet feed cassette 170 located in lower portion of the copier main body 100, or accommodated in the paper feed unit (PFU) 200, the recording sheet P is accommodated in the FNS apparatus 400 after passing through the conveyance section 140, the fixing section 150, and the delivery sheet switching section 160, which is called a main route. The recording sheet P branching from the delivery sheet switching section 160 is temporarily stocked in the ADU unit 180, and after that, the recording sheet P is fed again to the sheet feed section 130 in the copier main body 100, which is called a circulation route.

Figure 2:
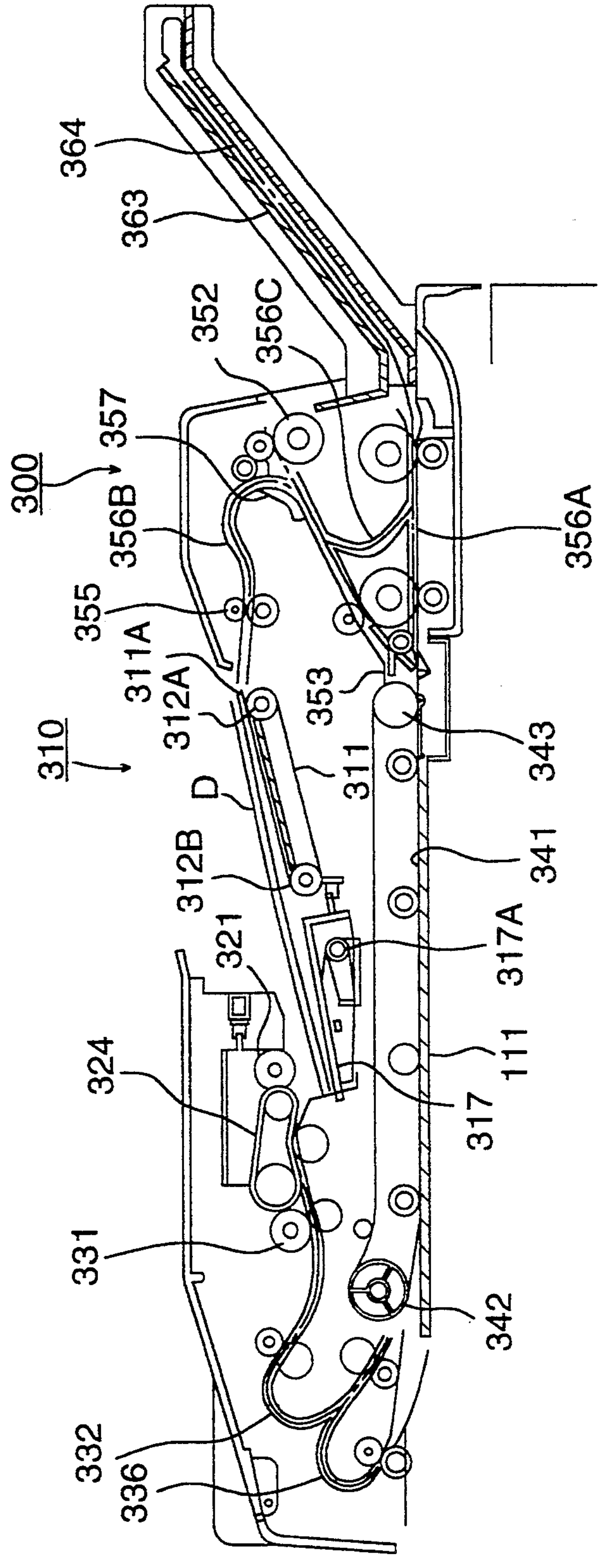
FIG. 2 is a sectional view of an RDH apparatus.

FIG. 2 is a sectional view showing the structure of the RDH apparatus 300. In the drawing, a stack of documents D are placed on a platen 310 while the image surface is maintained upward. When a copy button is pressed, a movable pressure plate 317 is rotated around an oscillation shaft 317A clockwise and the surface of the uppermost document is contacted with a feed roller 321 with pressure.

When a feeding system, such as a supply belt 311 stretched between a driving roller 312A and an idle roller 1 312B, is operated, the documents D are started to be fed. The documents D are fed to a reverse sheet feeding path 332 by a conveyance roller 331 through a double feeding prevention belt 324. When the document D passes through the reverse sheet feeding path 332, the image surface is turned downward, and conveyed onto a platen glass 111 through the conveyance belt 341 stretched between the driving roller 342 and the idle roller 343. When a sensor (not shown in the drawing) detects the position of the document D, the conveyance belt 341 is stopped, and the document D is set at the exposure position. Next, the document D is exposed and scanned when the scanning exposure section 110 is operated. When the exposing and scanning operation has been completed, the conveyance belt 341 is driven and the feeding operation is started again. The document D is fed to a reverse sheet feeding path 356B being guided by guide members 353 and 357, and the image surface of the document D is turned upward.

The document D, the image surface of which is turned upward, is conveyed to a lower side of an interposing member 311A of a feed belt 311 through a conveyance roller 355. The document D is successively supplyed to a lowermost surface of the stack of the documents D when a conveyance belt 311 is rotated. Accordingly, the documents D are automatically circulated for each volume, and the image reading operation is continued.

In the case where the document D is a two sided document, the document D, an image A on the upper surface of which has been read, is fed again onto the platen glass 111 through a reverse sheet feeding path 336 when the conveyance belt 341 is reversely rotated. Then, an image B on the lower surface of the document D is read.

As described above, the document D, in which two sided document images have been read, is temporally delivered to a reverse sheet delivery path 364 being guided by a guide member 353. After that, the document D is supplied onto a lowermost layer surface of a stack of documents D through reverse sheet feed paths 356C and 356B being guided by guide members 356A and 357 while the image surface is turned upward.

In the foregoing, a circulation sheet feeding operation of the document D is stated. The RHD apparatus 300 is provided also with the function of an automatic document feeder (ADF). In this case, the document D, the image of which has been read, is moved straight being guided by the guide member 353, and delivered through the delivery roller 352 onto a delivery tray 363 and stacked thereon, while the image surface is maintained downward.

The image of the document D thus obtained is recorded onto the recording sheet P, which is fed from the sheet feed cassette 170 or the PFU apparatus 200, through an image processing process by the copier 100. The recording sheet P, on which the image has been recorded, is temporally fed to the ADU device 180, and reversed. Then, the recording sheet P is delivered from the copier main body 100 while the image surface is maintained downward, and fed to the FNS apparatus 400 according to the present invention.

Figure 3:
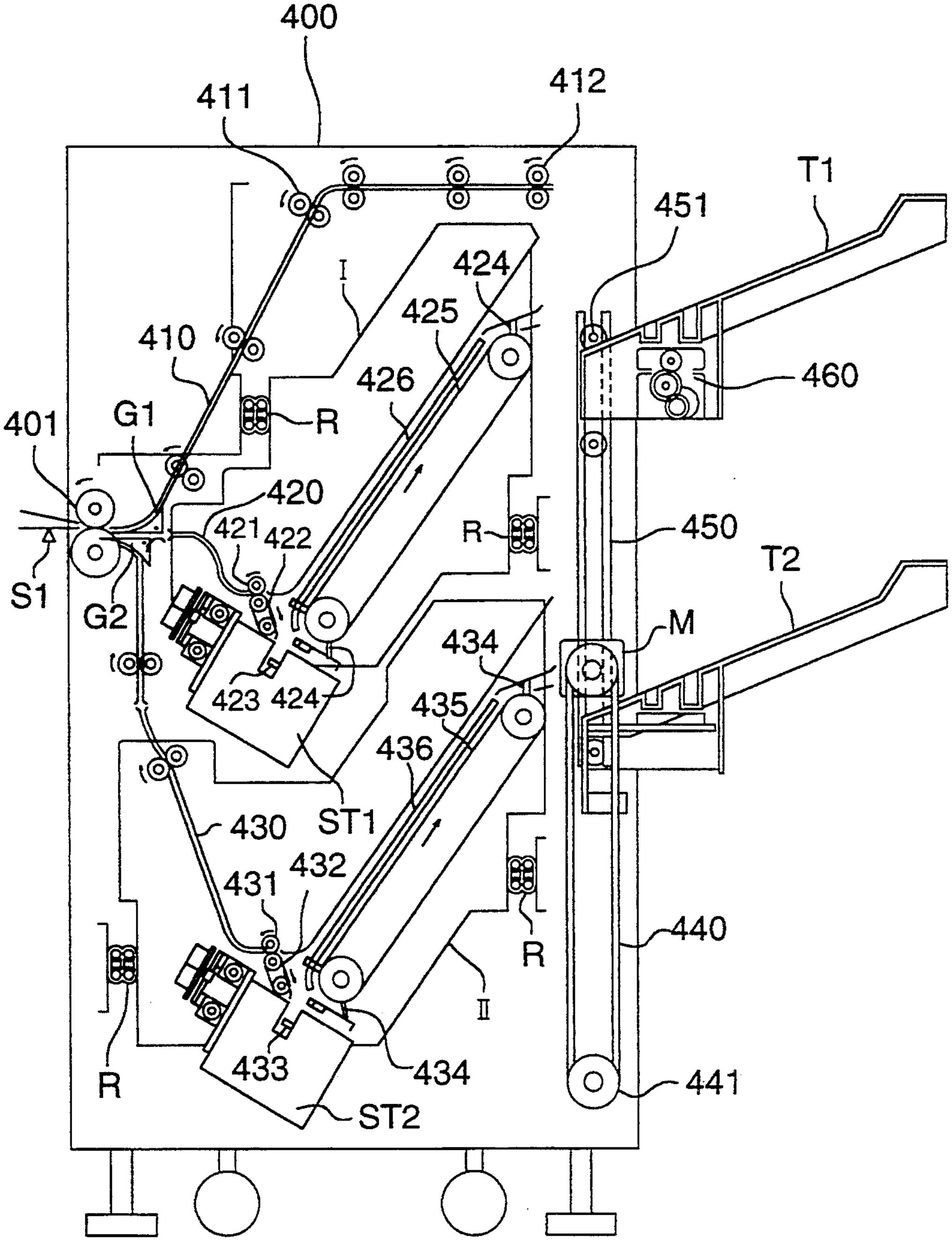
FIG. 3 is a sectional view of the recording sheet finishing apparatus.
Figure 4:
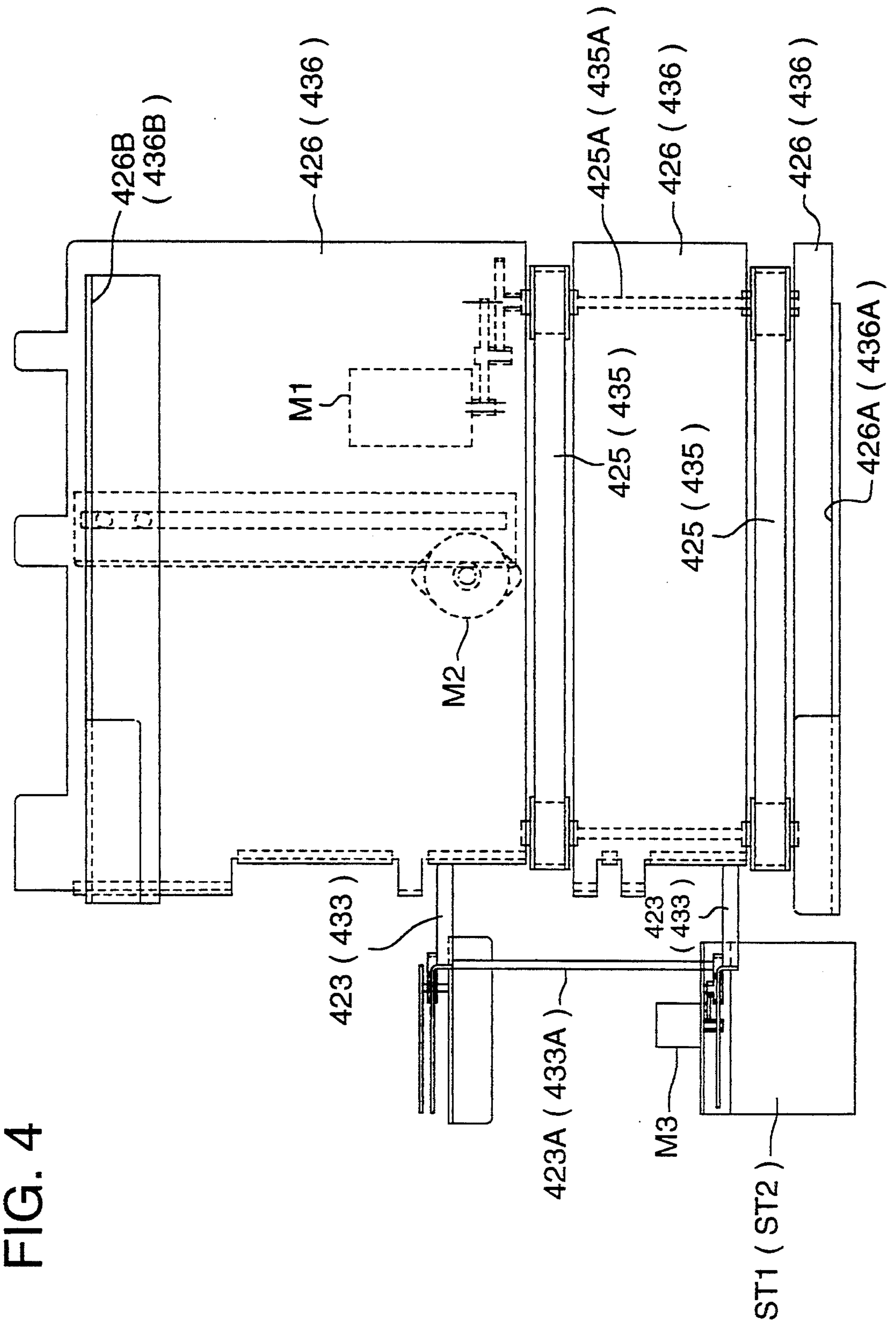
FIG. 4 is a plan view of the main portion of the recording sheet finishing apparatus.

FIG. 3 is a sectional view showing the structure of the FNS apparatus 400, and FIG. 4 is a plan view of a main portion of the FNS apparatus. The FNS apparatus is provided under the condition that the position and height of apparatus are adjusted so that the position and height of the receiving roller 401 of the recording sheet P are matched with those of the delivery port of the copier main body 100, and is connected to a control system so as to be driven corresponding to the operation of the copier main body 100.

The conveyance path of the recording sheet P, which is connected to the back of the receiving roller 401, branches to a conveyance path 410 for an offset type sheet delivery, in which recording sheets are delivered onto a delivery tray T1 without being stapled, and stacked thereon for each volume, and also branches to the first and second conveyance paths 420 and 430. The recording sheet P is fed to one of these conveyance paths when angles of switching gates G1 and G2 are selected.

The first and second conveyance paths 420 and 430 are provided with conveyance rollers 421,431, and guide belts 422, 432, which are contacted with the rollers 421 and 431 with pressure, in downstream end portions of the conveyance paths. The first and second delivery belts 425 and 435 on which delivery claws 424 and 434 are protrudingly provided respectively, are mounted on the positions facing conveyance rollers 421 and 431. The first and second stackers 426 and 436 are respectively provided at the positions interposing these belts, forming predetermined inclination angles.

Further, the first stapler ST1 is disposed in a position opposing to a lower end portion of the first stacker 426, and the second stapler ST2 is disposed in a position opposing to a lower end portion of the second stacker 436.

A couple of supporting members 450, which are engaged with a plurality of guide rollers 451 and vertically moved, are provided on the right side portion of the FNS apparatus 400. The first delivery tray T1 and the second delivery tray T2 are respectively provided between a couple of supporting members 450, and are vertically moved separately.

The couple of supporting members 450 are fixed to elevation wires 440 which are stretched between an exclusive motor M and a pulley 441. When the motor M is rotated, the first delivery tray T1 and the second delivery tray T2 are vertically moved separately.

Figure 6:
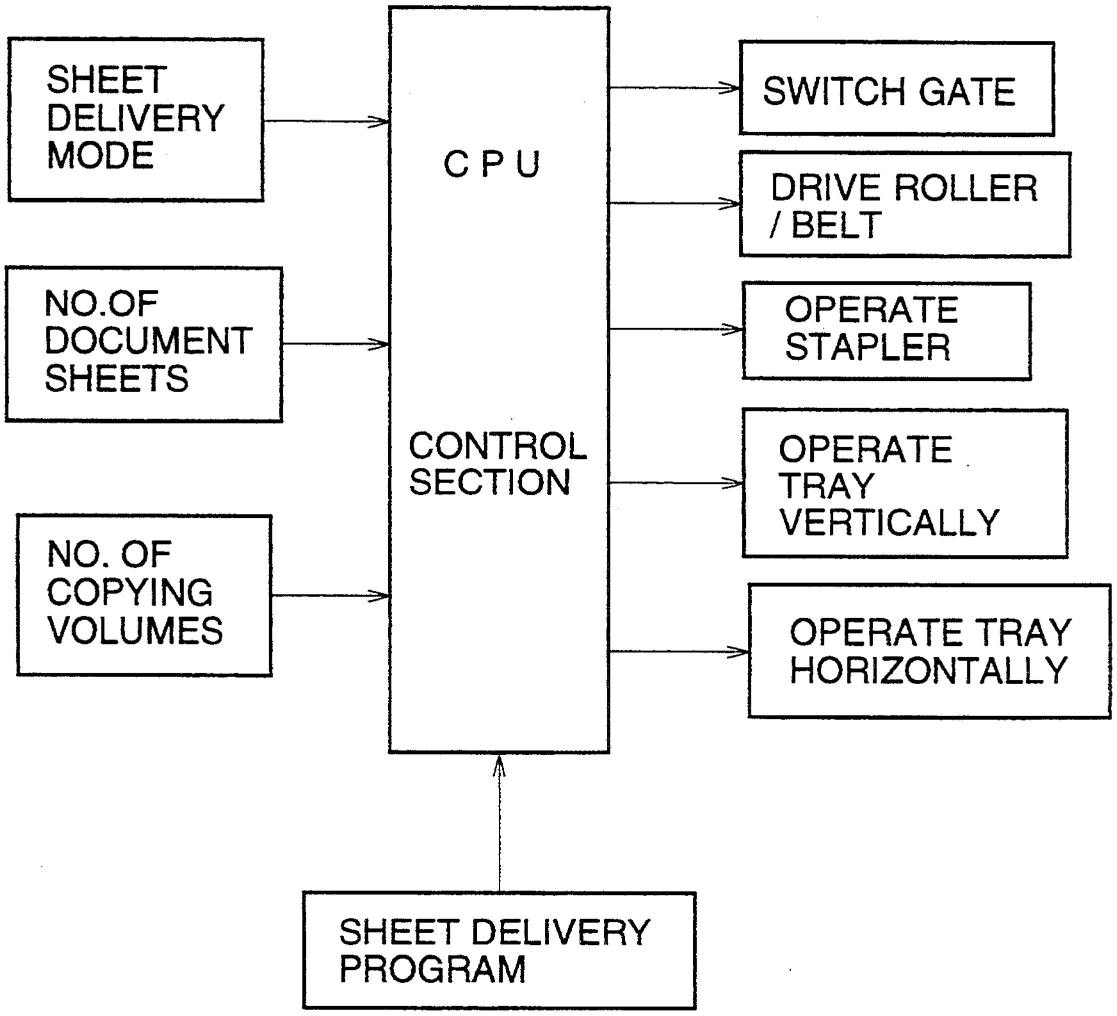
FIG. 6 is a block diagram showing the basic concept of a control system.

A control circuit accommodated in the copier main body 100 comprises basic circuits as shown in FIG. 6. Before the copying operation is started, a sheet delivery mode is selected, and the number of documents and the number of copy volumes are set.

When a stapling mode is selected as the sheet delivery mode, switching gates G1 and G2 are located forming the angles shown in FIG. 3. Accordingly, the recording sheet P fed by a receiving roller 401 is moved straight, and fed to the first conveyance path 420. The recording sheet P then is pushed onto the first stacker 426 through the conveyance roller 421, and temporarily stacked there. At this time, the back end portion of the recording sheet P is introduced into a stapling section of the first stapler ST1 when the guide belt 422 is idly rotated.

Figure 5:
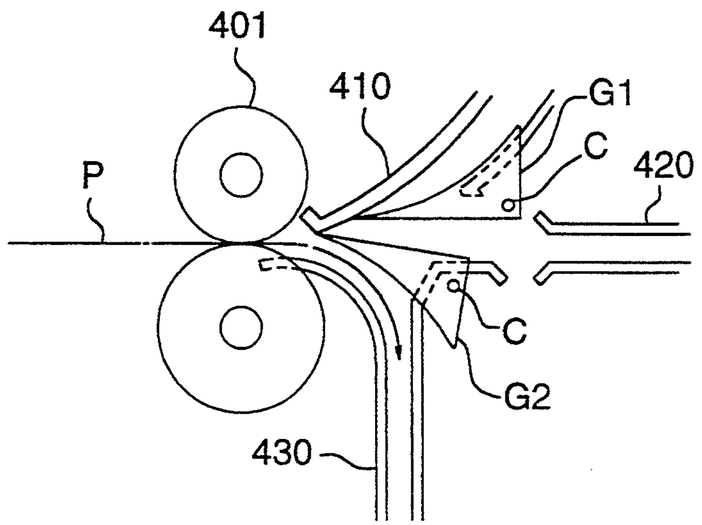
FIG. 5(*a*) and FIG. 5(*b*) are sectional views of a recording sheet receiving portion of the recording sheet finishing apparatus.
Figure 5:
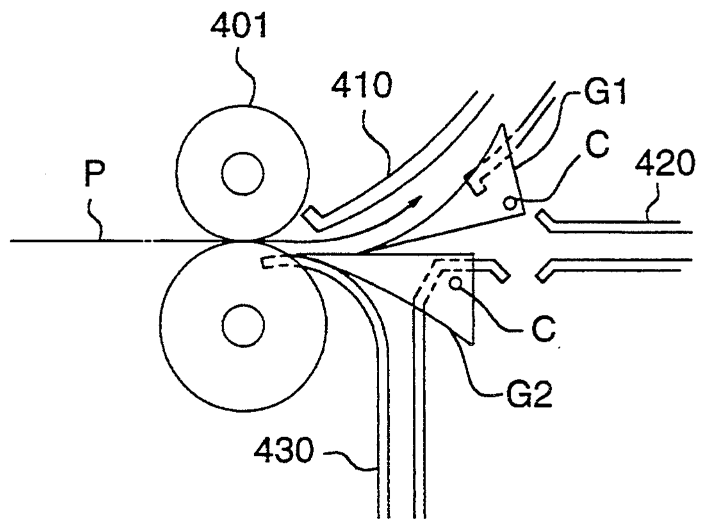

After the final recording sheet P of the first copy volume, stacked on the first stacker 426, corresponding to the number of documents D, is detected by a sensor $S_1$, the following operations are conducted: the switching gate G2 is rotated around the fulcrum C and the angle of the gate G2 is changed to the angle shown in FIG. 5(*a*); the recording sheets P of the second copy volume are downwardly fed and fed to the second conveyance path 430; and the recording sheet P is pushed onto the second stacker 436 by a conveyance roller 431 and a guide belt 432 in the same way as described above.

On the other hand, while the recording sheets P of the second copy volume are fed, the recording sheets P of the first copy volume which have been completely stacked, are stapled by the first stapler ST1, then are pushed up onto the first stacker 426 against the gravity and placed at a predetermined position on the stacker 426, when transfer levers 475 are returned.

The transfer levers 475 are reciprocally operated to the position shown by a broken line in FIG. 4 only when the bundle of the stapled recording sheets are delivered. A couple of stoppers 423 are simultaneously operated by a motor M3 through gears and a transmission shaft 423A.

Next, the first delivery belt 425 shown in FIG. 1 is rotated in the arrowed direction, and delivers the recording sheets P of the first volume, which are stapled while a delivery claw 424 pushes up the back end surface of the recording sheets P and stops after one rotation, onto the first delivery tray T1. A couple of the first delivery belts 425 are simultaneously operated by the motor M1 through gears and a transmission shaft 425A.

A stacking operation of the recording sheets P of the second volume is completed during the above operations, and the angle of the switching gate G2 is returned to the angle shown in FIG. 5(*a*). The stapling operation of the recording sheets P of the second copy volume is conducted by the second stapler ST2, and the recording sheets P of the second copy volume stapled by a projection of a stopper 433 and rotation of the second delivery belt 435 are delivered onto the the second delivery tray T2 in the same way as described above.

As described above, according to the FNS apparatus 400 of the present invention, since a plurality of volumes of the recording sheets P, on which images are recorded, can be collated and stapled in parallel at two locations without time difference, the recording sheet P can be rapidly finishing processed.

The motor M is operated corresponding to an amount of the recording sheets P to be delivered, and the first and second delivery trays T1 and T2 are lowered corresponding to the processed amount of the recording sheets P, so that the delivery of the recording sheets P can be conducted.

When the offset mode is selected as the sheet delivery mode, the following operations are conducted. Angles of the switching gates G1 and G2 are respectively set at the angles shown in FIG. 5(*b*); the recording sheet P is fed upwardly, and fed onto the first conveyance path 410; and the recording sheet P is delivered onto the first delivery tray T1 through the conveyance rollers 411 and 412.

The first delivery tray T1 has an offset driving section 460 which can reciprocally moved in the perpendicular direction to the drawing, and each volume of the recording sheets P is stacked zigzag in the lateral direction with respect to the delivery sheet, and can be easily sorted.

When the first and second staplers ST1 and ST2 are respectively provided at the viewer's side of the first and second stackers 426 and 436, one portion of the upper left portion of the recording sheets P can be stapled in the case where the recording sheet P is delivered under the condition that the length of the recording sheet P is set along the delivery direction. When another stapler is provided at the far side of the drawing, two portions of the recording sheets P can be stapled. Further, when the recording sheet P is delivered under the condition that the width of the recording sheet P is set along the delivery direction, one portion of the upper left portion of the recording sheets P can be stapled.

The position of the delivered recording sheet P on stacker 426 (436) is regulated by: a rising surface 426A (436A) integrally formed with the stacker 426 (436); and a slide member 426B (436B) which is moved in parallel by the motor M2 through the engagement of pinions and racks.

Each stapler, stacker and delivery are supported by a couple of base plates I and II, and can be attached to and detached from the base plates through a couple of guide rails respectively provided thereon in the FNS apparatus 400. When the viewer's side of the apparatus in the drawing is opened by a door, the foregoing staplers can be detached from the apparatus in a unit, so that maintenance operations such as jamming processing can be easily carried out.

Figure 7:
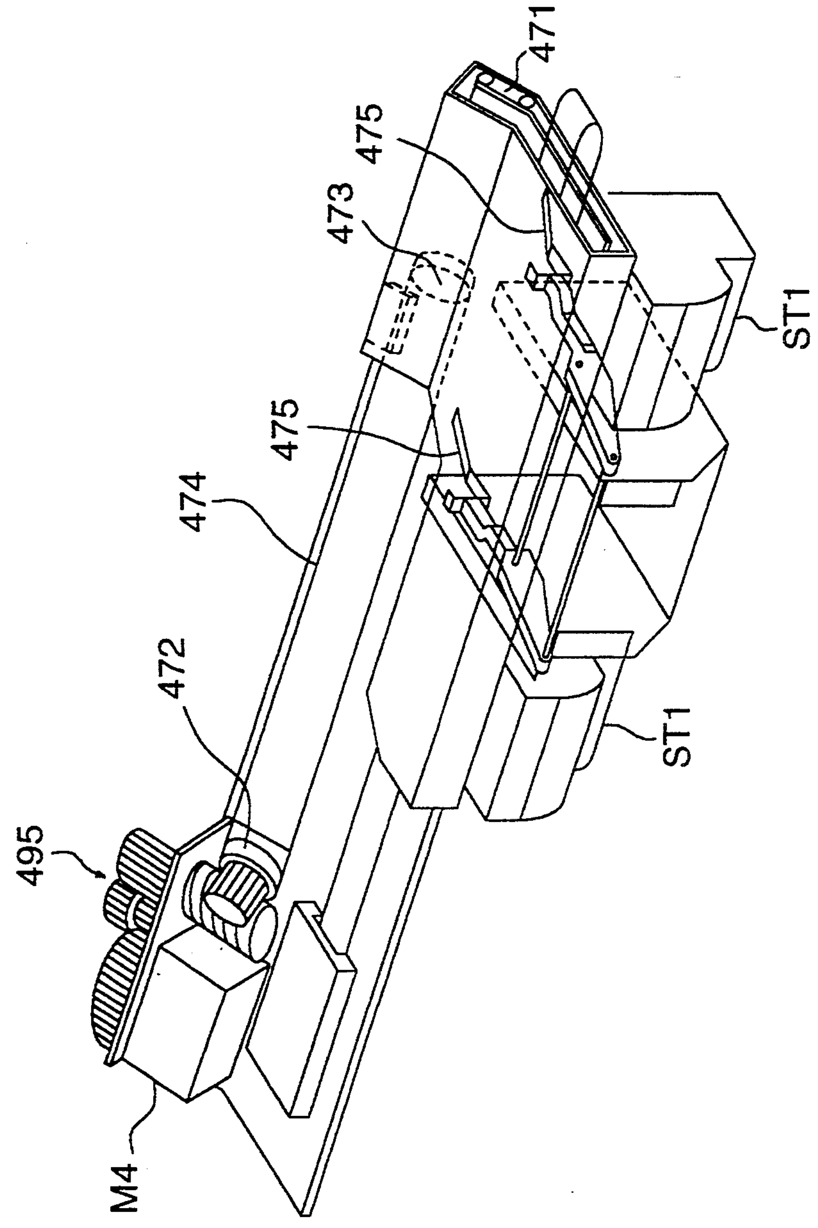
FIG. 7 is a perspective view of the staplers and the recording sheet transfer portion.
Figure 8:
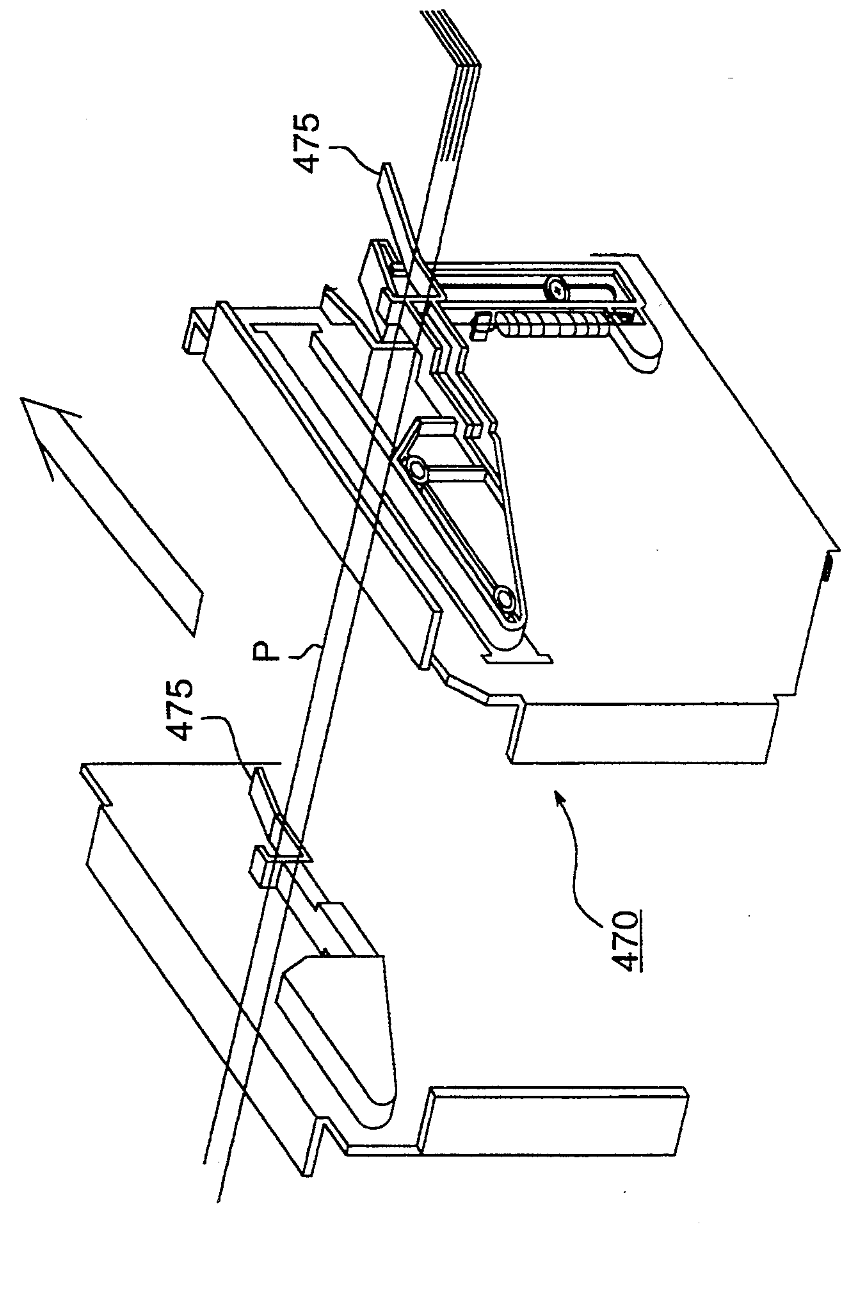
FIG. 8 is a perspective view of the recording sheet transfer portion.
Figure 9:
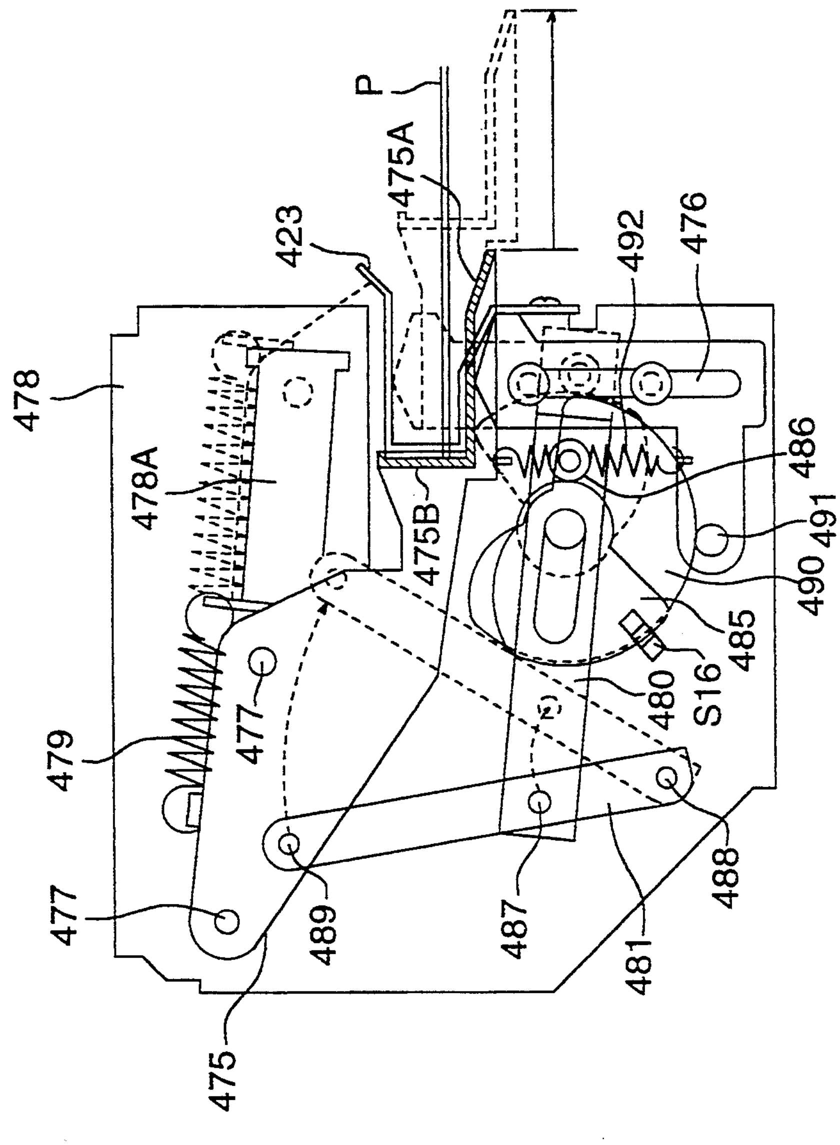
FIG. 9 is a side view of the recording sheet transfer portion.
Figure 10:
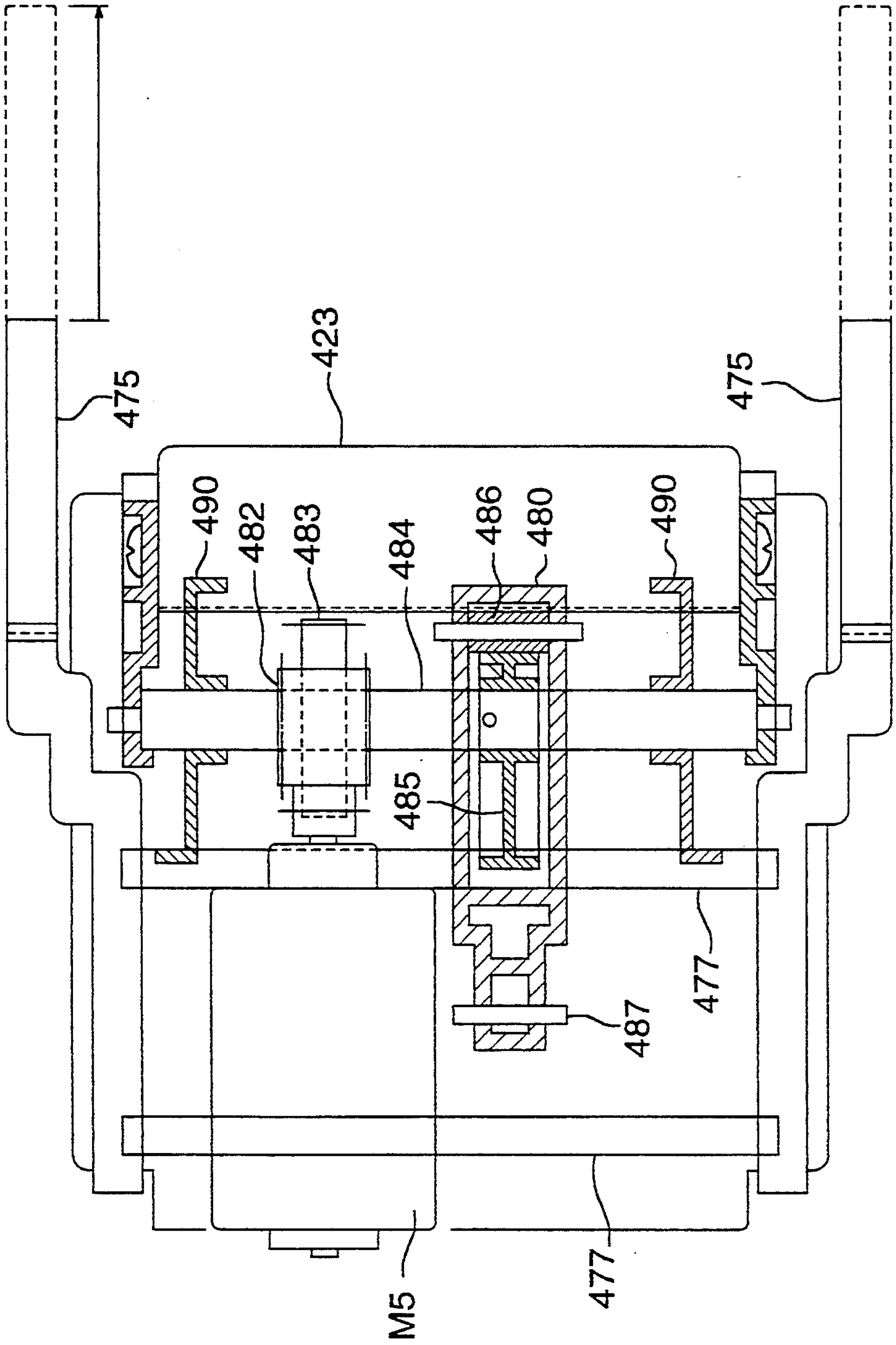
FIG. 10 is a plan view of the recording sheet transfer portion.

FIG. 7 is a perspective view of the stapler ST1 (ST2) and the recording sheet transfer section 470. FIG. 8 is a detailed perspective view of the recording sheet transfer section. FIG. 9 is a side view of the recording sheet transfer section, and FIG. 10 is a plan view thereof. In this connection, the transfer section provided at the end of the first conveyance path 430 shown in an upper portion in FIG. 3, and stapler ST1 have the same structure as that of the transfer section provided at the end of the first conveyance path 430 shown in a lower portion in FIG. 3, and stapler ST2, and therefore, their structures will be described hereinafter as common.

The transfer section 470 is integrally provided with stapler ST1 (ST2), and they can slide on a slide rail 471. They are fixed to a portion of a rotatable timing belt 474 stretched between a drive pulley 472 and a driven pulley 473. The drive pulley 472 is connected to a stepping motor M4, which is a drive source, through the gear train 495. The drive and position control of the transfer section 470, and stapler ST1 (ST2) are carried out by the stepping motor M4.

The transfer section 470 has the following structure in which: the trailing edge of the recording sheet P, which has been introduced from the conveyance path 420 (430), interposed between the conveyance roller 421 (431) and the guide belt 422 (432), slid on the conveyance belt 425 (435), moved upward, and moved downward after delivery, is temporarily held and stopped; after the recording sheets P are stapled (stapling processed) at this stop position, the recording sheet P is sent out again, and sent by the delivery claw 424 (434) provided on the delivery belt 425 (435).

The transfer section 470 comprises: a stopper 423 (433) to which the trailing edge of the recording sheet P is pushed for aligning the edge of the recording sheet P, and which is used as a reference for the pushing operation; a couple of transfer levers 475, which are movable and which send the recording sheet P to the delivery belt; and a couple of movable pressing levers 476 which press the recording sheet P at the time of stapling.

The transfer lever 475 has a guide surface section 475A for introducing the recording sheet P, and a pushing surface 475B which pushes out the trailing edge of the recording sheet P. A couple of transfer levers 475 are connected by two connection bars 477, and integrally formed with each other. The transfer lever 475 can slide in a guide groove section 478A provided in the frame 478 of the transfer section 470 (indicated by a broken line shown in FIG. 9). The transfer lever 475 is urged by a spring 479 in one direction. The transfer lever 475 is moved through the first link member 480 and the second link member 481 which are driven by a motor M5, which is a driving source. The driving force of the motor M5 is transmitted to a drive shaft 484 for rotating the shaft 484 through a gear train comprising a worm 482 and a worm wheel 483, by which the speed of the motor M5 is reduced. A cam 485 is fixed in the proximity of a central portion of the drive shaft 484. A roller-shaped cam follower 486 is rotatably supported by one end of the first link member 480. When the cam 485 is rotated, the cam follower 486 is contacted with the cam with pressure and follows it, and thereby, the first link member 480 can be moved in the lateral direction shown in FIG. 9 (shown by a broken line). The left end of the first link member 480 is rotatably connected to the second link member 481 by a pin 487. The second link member 481 is supported by a fulcrum pin 488 such that the member 481 can be oscillated around a fulcrum pin 488. The other end of the second link member 481 is connected to the transfer lever 475 by a pin 489.

In FIGS. 9 and 10, the solid line shows the initial position of the recording sheet transfer section, and the stopping position thereof at stapling, and the broken line shows the condition that the stapled recording sheets P are sent out to the delivery belt 425 (435) side. When the motor M5 is rotated, the driving shaft 484 is rotated through the worm 482 and worm wheel 483. When the cam 485, integrally formed with the driving shaft 484, is rotated, the cam follower 486 is contacted with the cam with pressure, the first link member 480, integrally formed with the cam follower, is moved to the right direction, the first link member 481 is oscillated clockwise, in the drawing, around the fulcrum pin 488, and the transfer lever 475 is moved in the right direction in the drawing. When the transfer lever 475 is moved, the pushing surface 475B of the transfer lever 475 pushes out the trailing edge of the recording sheet P, and sends the recording sheet P to the delivery belt 425 (435) side.

Next, a sheet pressing operation by a sheet pressing lever 476, by which the recording sheet P is pressed before a stapling operation, will be explained.

Two cams 490 are fixed in the proximity of both ends of the driving shaft 484, and contacted with a cam follower 491 fixed to the lower portion of the sheet pressing lever 476 with pressure. When the driving shaft 484 is rotated, the cam follower 491, which is contacted with the cam 490 with pressure, is moved upward with the sheet pressing lever 476 against the urging force of the spring 492, and pushes with pressure the trailing edge of a bundle of the recording sheets to the upper surface of the inside of the C-shaped stopper 423 (433). In this condition that the recording sheets are pressed, the stapling operation is conducted by staplers ST1, and ST2. A sensor 16 is a photo-interrupter type optical sensor to detect the sheet pressing operation by the sheet pressing lever 476, and generates a signal when an optical path is made on/off by an optical path interruption section provided on the cam 490.

Figure 11:
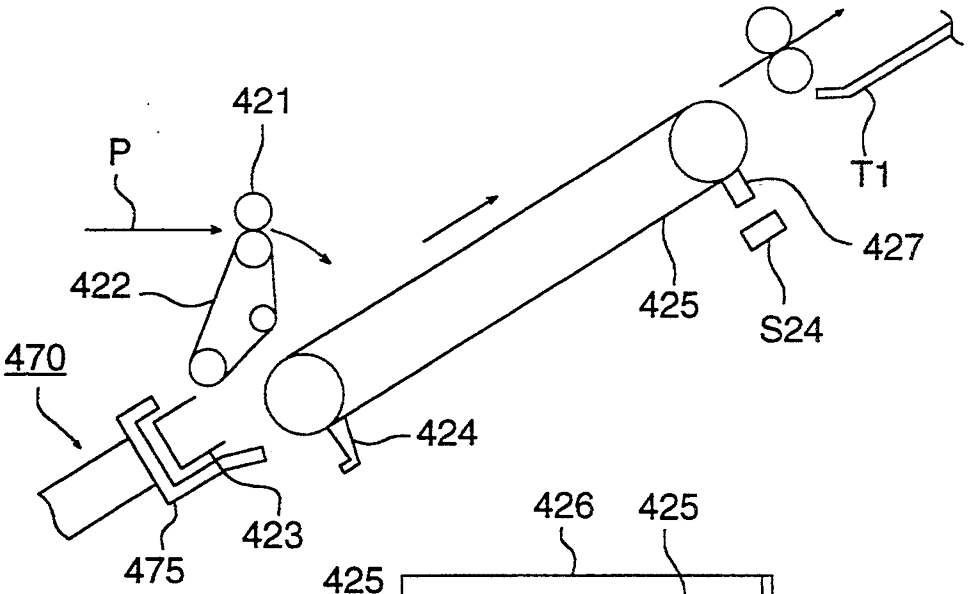
FIG. 11(A), FIG. 11(B), and FIG. 11(C) are illustrations of a recording sheet delivery portion.
Figure 11:
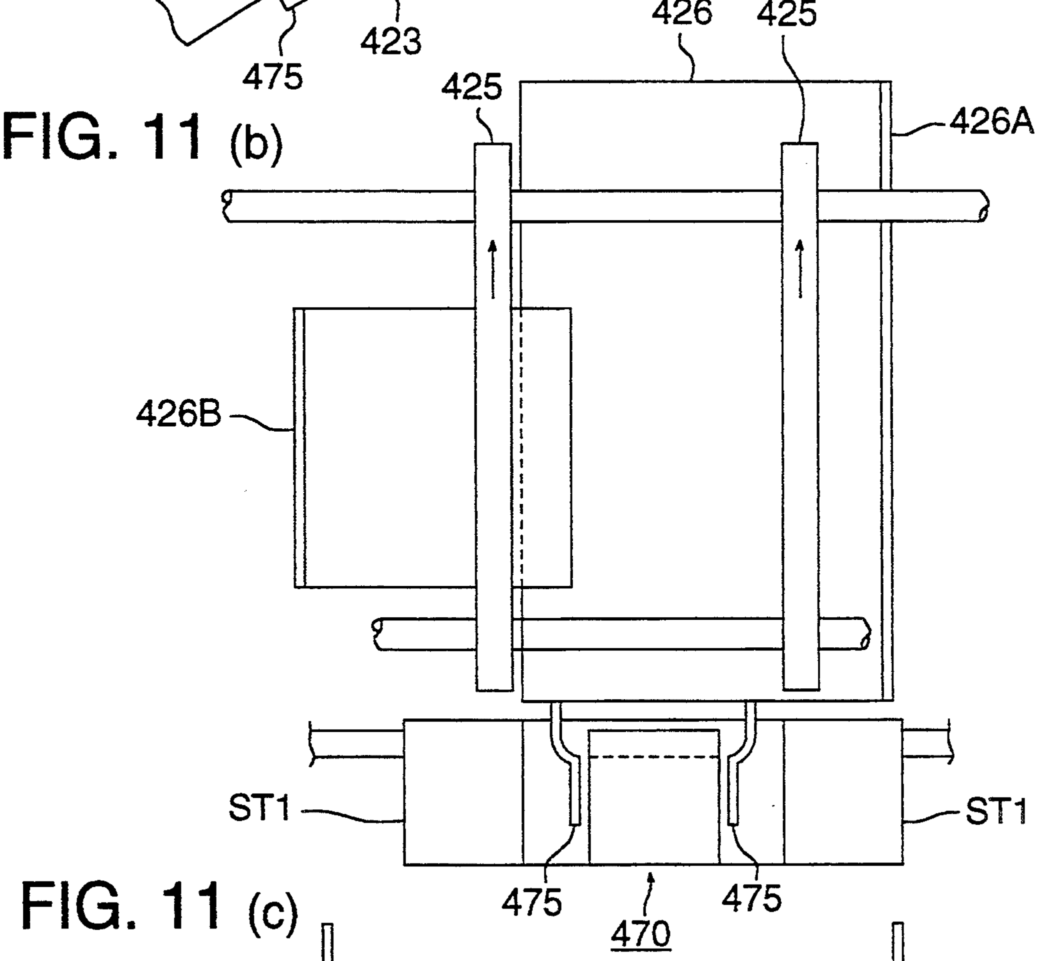
Figure 11:
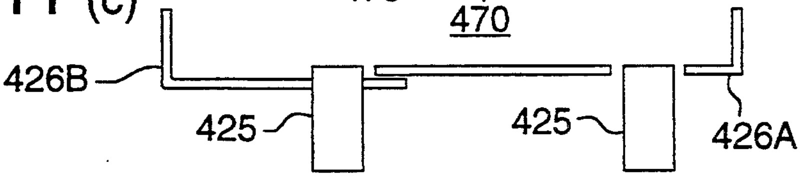
Figure 12:
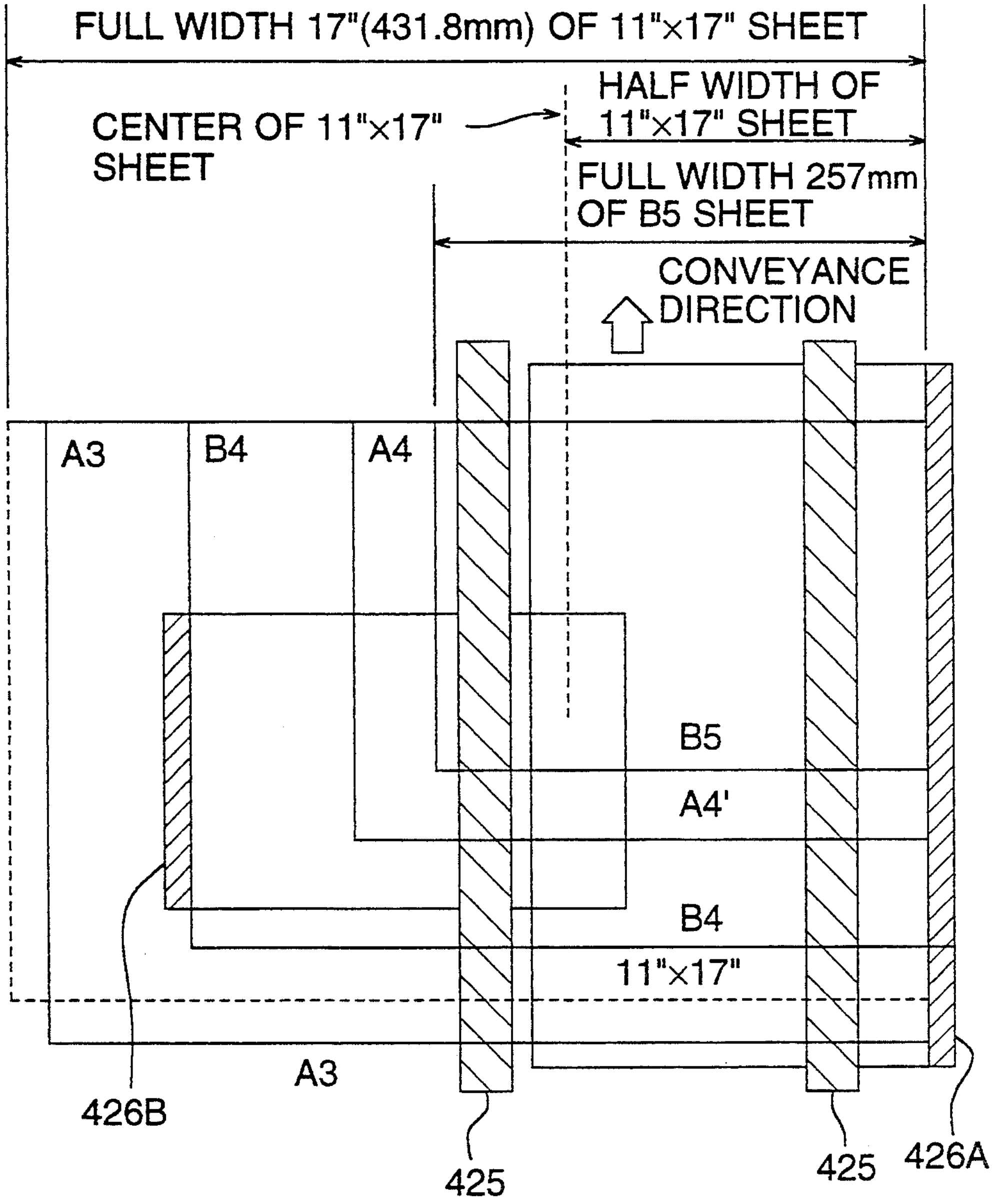
FIG. 12 is a plan view showing circumstances in which recording sheets of various sizes are stacked on a delivery tray in the recording sheet delivery portion.

FIGS. 11(A)–11(C) show an illustration of the recording sheet delivery section, FIG. 11(A) is a side view, FIG. 11(B) is a plan view, and FIG. 11(C) is a rear view. FIG. 12 is a plan view showing the condition that various sizes of recording sheets are stacked in the delivery section under the condition that one sides of the recording sheets are aligned with a reference line.

When bundles of the recording sheets, one side of which is aligned with the reference line, are conveyed by the delivery claws of two belts 425 (435), the center of gravity of the recording sheets P is different depending on the sizes of the recording sheets. Accordingly, when the delivery belt 425 (435) does not include the center of gravity of the recording sheets, bundles of recording sheets are inclined, so that the recording sheets can not smoothly be conveyed. Further, when one delivery belt is used, the belt having a large width is necessary, resulting in increasing the manufacturing cost.

According to the present invention, two delivery belts 425 (435) are rotatably provided, and various sizes of recording sheets can be delivered without being inclined. That is, when one stapling operation is conducted in a front portion or back portion of large sized recording sheets, position of stapler ST1 (ST2) and the transfer section are longitudinally deviated, and therefore, the center of gravity of the recording sheets are out of the transfer lever 475. In this case, after stapling processing, the transfer operation is carried out after the transfer lever 475 has been moved on a sliding rail 471 of a moving means to a position including the center of gravity by the rotation of a timing belt 474.

Figure 13:
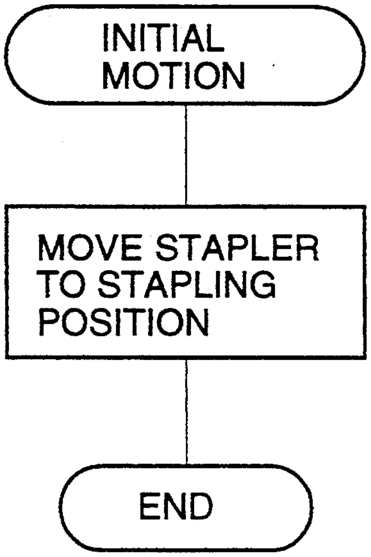
FIGS. 13(A) and 13(B) are flow charts of the recording sheet finishing process.
Figure 13:
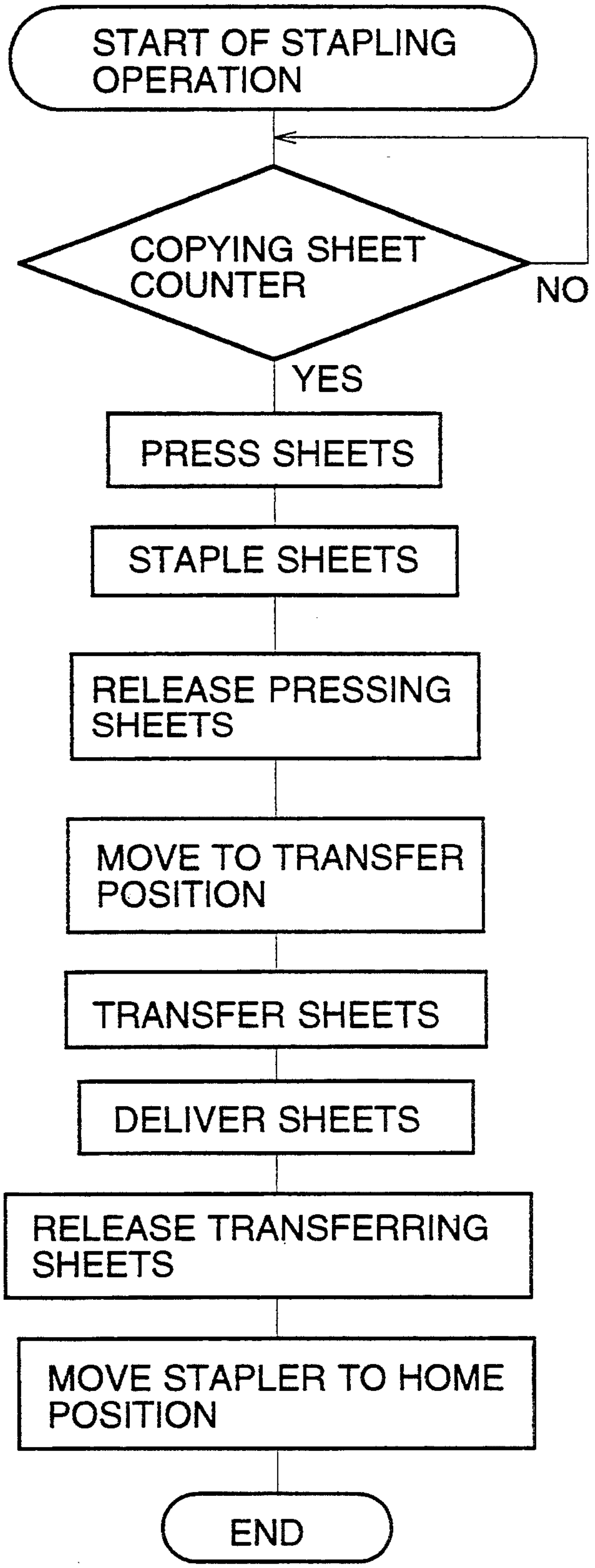

As described above, since a unit, in which the stapler ST1 (ST2) and the transfer section are integrally formed with each other, is moved after stapling processing, a position including the center of gravity of the recording sheets P can be pushed, and thereby, the recording sheets are not inclined and the transfer operation can be smoothly carried out. Further, even when there are obstacles, such as the delivery belt 425 (435), in the transfer position of the transfer lever 475, because the recording sheets are transferred onto the delivery belt 425 (435) side after movement of the transfer lever, the stapling operation can be carried out in an arbitrary position. FIGS. 13(A) and 13(B) show flow charts of the process of the above-described recording sheet finishing processing.

Figure 14:
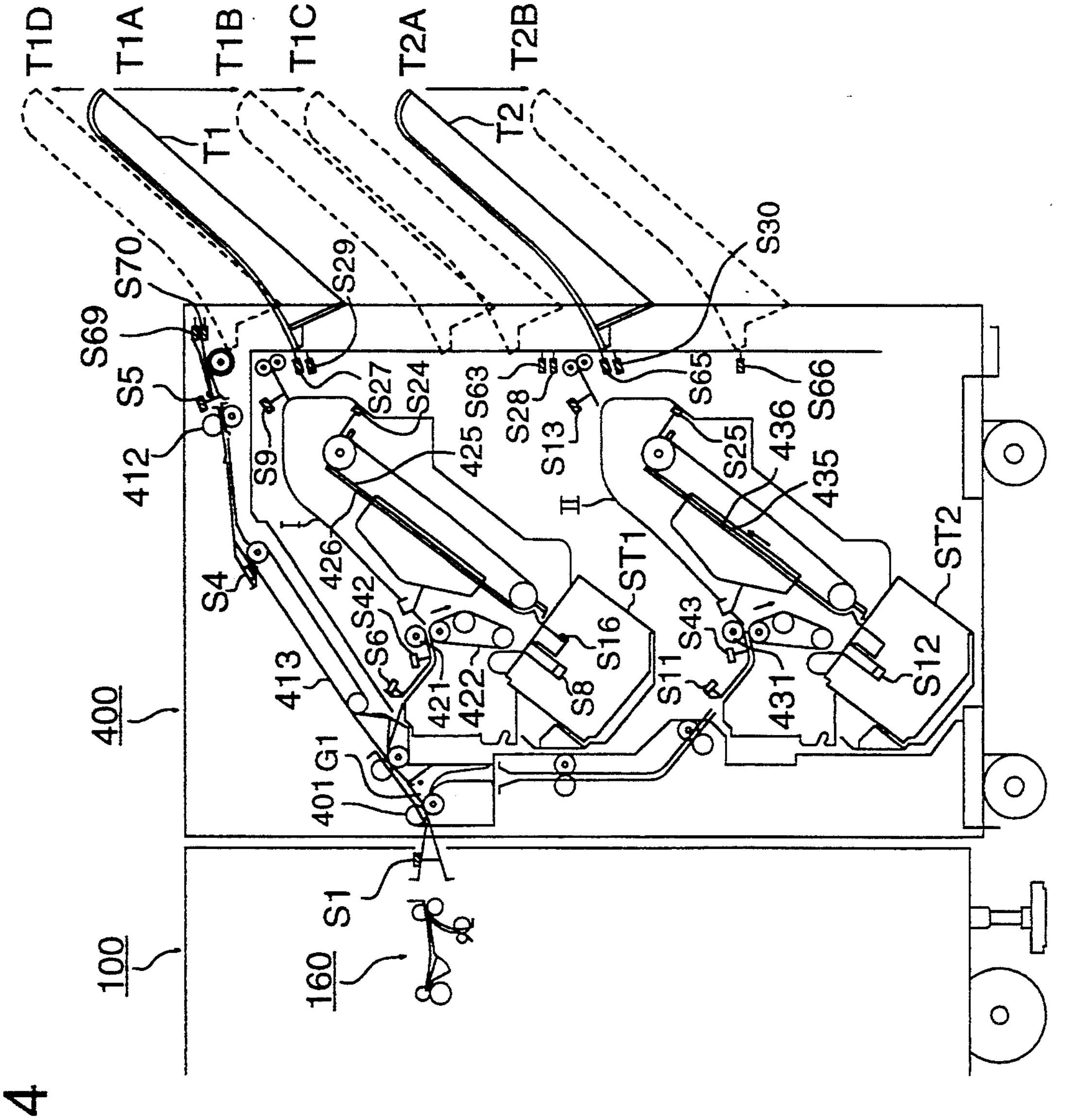
FIG. 14 is a view showing the structure of the recording sheet finishing apparatus.

FIG. 14 is a view showing sensor positions and movement of the delivery trays in the improved recording sheet finishing processing apparatus 400 according to the present invention. Like parts in each of FIGS. 3 and 14 are identified by the same reference numeral. Only different points from FIG. 3 will be explained as follows.

Initially, a sheet passing sensor S1 is provided in the proximity of the introduction opening for the recording sheets in the FNS apparatus 400, and detects the existence of the recording sheet P in the FNS apparatus 400 when the recording sheet P passes through the sensor position. A sheet passing sensor S4 is provided in the proximity of the downstream of the conveyance belt 413 of the offset conveyance path 410, and detects the existence of the recording sheet. A sheet delivery sensor S5 is provided in the proximity of a conveyance roller 412 located in a further downstream portion, and detects the existence of the recording sheet.

Sheet passing sensors S6, and S42 are provided in the upstream portion of the conveyance roller 421 of the first conveyance path 420 located in the lower portion of the offset conveyance path 410, and detect the passage of the recording sheet P. A sensor S8 detects the existence of the recording sheet P on the first stacker 426 located in the upper portion. S16 detects the pressing position of the recording sheet in the transfer section located in the upper portion. S24 is a home position sensor of the delivery belt 425. S9 is a sheet delivery sensor.

In the same way, sheet passing sensors S11, S43, a sheet existence detection sensor S12, and a sheet delivery sensor S13 are also provided in the second conveyance path 430.

Next, an offset upper portion detection sensor S69, and an offset sheet existence sensor S70 are provided in the proximity of a delivery opening of the offset conveyance path 410 located in the uppermost portion, in an elevation drive section for the delivery trays T1 and T2. A tray upper limit detection sensor S27, tray sheet removal detection sensor S29, tray collision detection sensor S63, and tray lower position detection sensor S28, by which an elevation operation of the first delivery tray T1 is controlled, are provided in the proximity of the delivery opening of the first conveyance path 420 located in the middle portion, and in its lower portion. A tray upper limit position detection sensor S65, and a tray sheet removal detection sensor S30, by which an elevation operation of the second delivery tray T2 is controlled, are provided in the proximity of the delivery opening of the second conveyance path 430 located in the lower portion. A tray lower limit position detection sensor S66, by which a lowering operation of the second delivery tray T2 is controlled, is provided in the lowermost portion.

In FIG. 14, T1A shows an initial position (initial setting position) of the first delivery tray T1 at the stapling operation, and T1B shows a lower limit position thereof at the stapling operation under the condition that 1500 recording sheets at maximum are stacked on the tray. T1C shows an offset lower limit position of the first delivery tray T1 under the condition that 2000 recording sheets at maximum are stacked on the tray, and T1D shows an offset initial position thereof.

As a raised or lowered position of the second delivery tray located in the lower portion, T2A shows an initial position at the stapling operation, and T2B shows the lower limit position when the maximum number of recording sheets are stacked on the tray.

Figure 15:
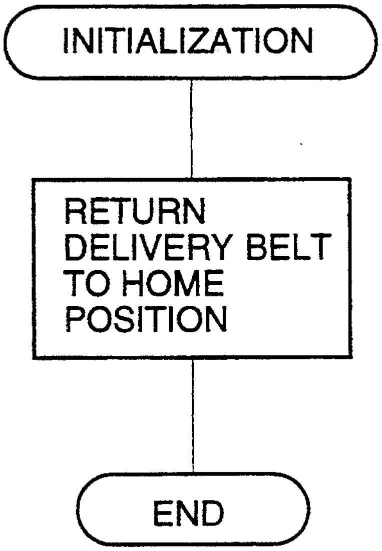
FIGS. 15(A) and 15(B) are flow charts showing a recording sheet delivering operation.
Figure 15:
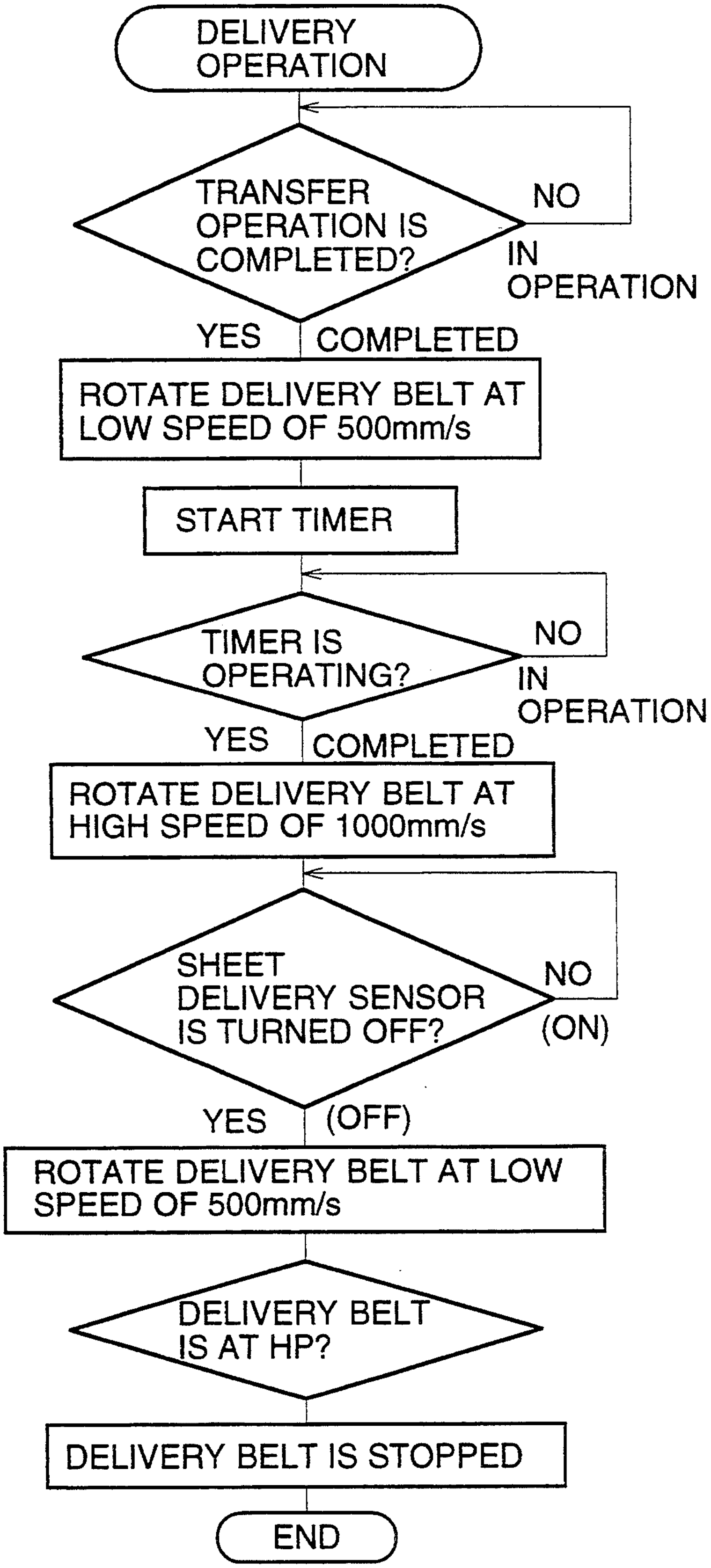
Figure 16:
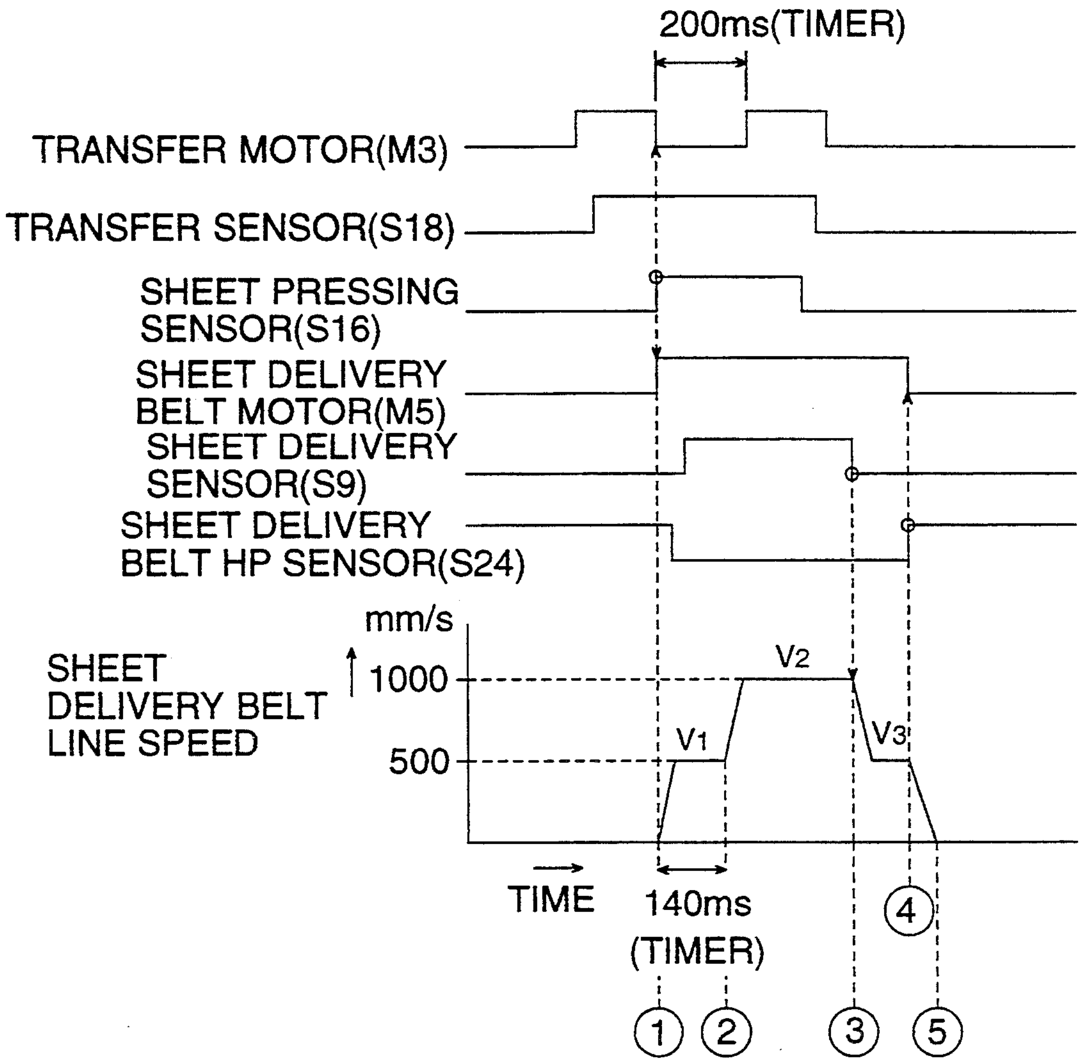
FIG. 16 is a time chart of the recording sheet transfer operation.

FIGS. 15(A) and 15(B) are flow charts of a recording sheet delivery operation by the recording sheet finishing processing apparatus 400 according to the present invention, and FIG. 16 is a time chart of the above-described operation. $t_1$ When the stapled recording sheets P is sent from the transfer section onto the delivery belt 425 (435), the delivery speed $V_1$ of the delivery belt 425 (435) is set at 500 mm/s, which is a low speed, and the belt starts its rotation. While the belt is rotated at this low speed, the delivery claw 424 (434) provided on the delivery belt 425 (435) presses the trailing edge of the recording sheet P and sends out the recording sheet P. $t_2$ A timer is started from the time when the delivery belt 425 (435) starts its rotation. After a period of time of 140 ms has passed, the delivery speed $V_2$ of the delivery belt 425 (435) is switched to 1000 mm/s, which is a high speed, and the recording sheet P is conveyed at the high speed. $t_3$ When the recording sheet P is separated from the delivery belt 425 (435), the sheet delivery sensor S9 (S13) is turned off, and the delivery speed $V_3$ of the delivery belt 425 (435) is decreased to 500 mm/s, which is a low speed. When a portion 427 (437) to be detected of the delivery belt 425 (435) passes through the photo-interrupter optical path of a home position sensor S24 (S25) at a low speed, the accuracy of the detection is increased. $t_4$ When the delivery belt 425 (435) is rotated at a low speed, and the home position sensor S24 (S25) is turned on, the sensor sends a signal to stop the drive of the delivery belt 425 (435). $t_5$ The delivery belt 425 (435) stops.

When the conveyance speed of the delivery belt 425 (435) is adjustably controlled as described above, the folding of the recording sheets after the stapling operation is eliminated at the low speed conveyance; the delivery belt 425 (435) is precisely stopped at the home position; and when the recording sheets are conveyed at a high speed in the middle portion of the conveyance path, a period of time for finishing processing is reduced, and the copy productivity can be increased.

Figure 17:
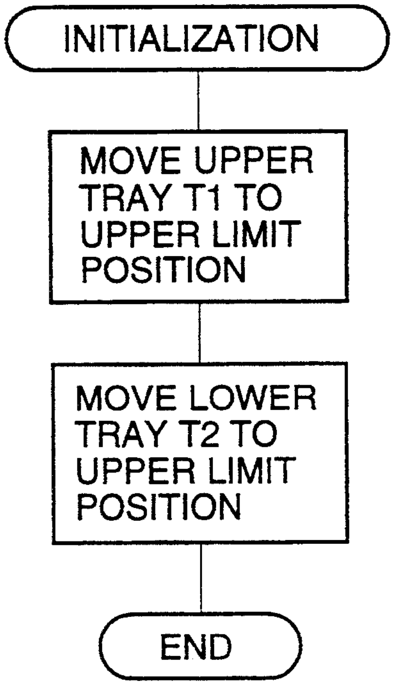
FIGS. 17(A) and 17(B) are flow charts showing circumstances in which the recording sheets are delivered and stacked on the delivery tray.
Figure 17:
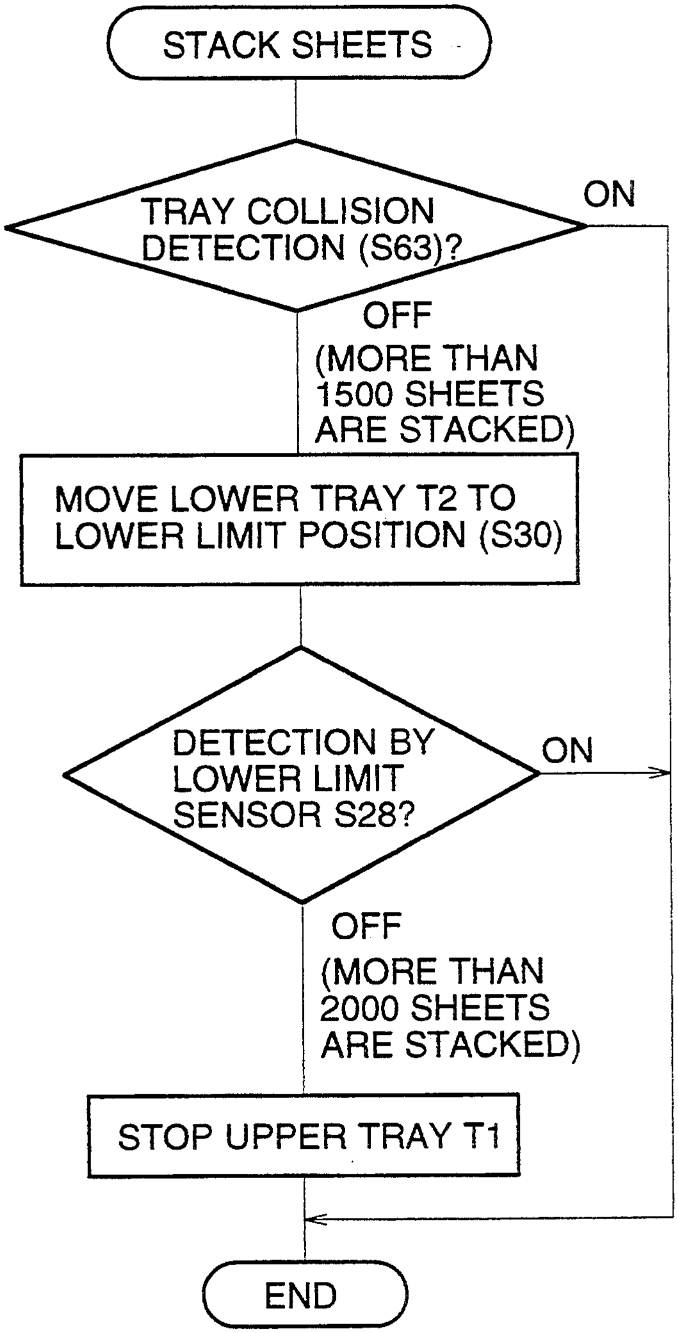

FIGS. 17(A) and 17(B) are flow charts showing the operation of the first delivery tray (the upper tray) T1 and the second delivery tray (the lower tray) T2. In the recording sheet finishing processing apparatus of the present invention, the elevation reference position (initial position) of the delivery trays T1 and T2 are detected by the tray sheet removal detection sensors S29 and S30, and the detection of stacked amounts of the recording sheets on the delivery trays T1 and T2 are conducted by the tray upper limit position detection sensors S27, and S65. Further, the lower limit of the delivery trays T1 and T2 is detected by the tray lower limit position detection sensors S28 and S66. The middle portion between the upper tray T1 and the lower tray T2 is detected by the tray collision detection sensor S63. When the lower tray T2 is regulated as described above, 2000 recording sheets P can be stacked on the upper tray T1.

Figure 18:
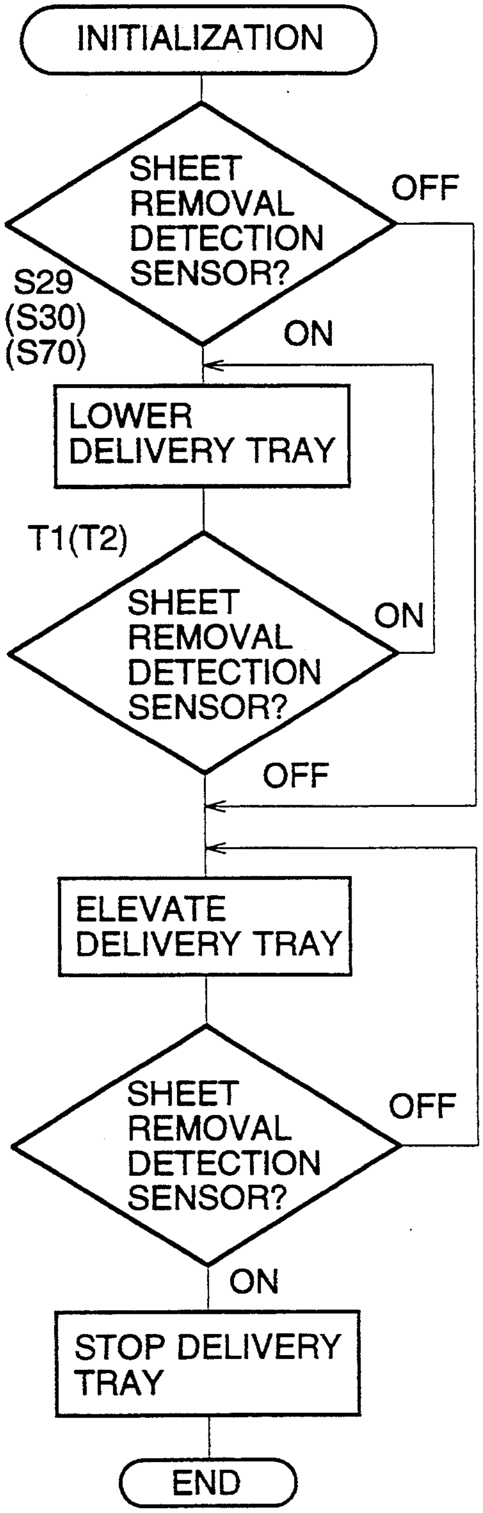
FIG. 18(*a*), FIG. 18(*b*) and FIG. 18(*c*) are flow charts showing the elevation control of the delivery tray.
Figure 18:
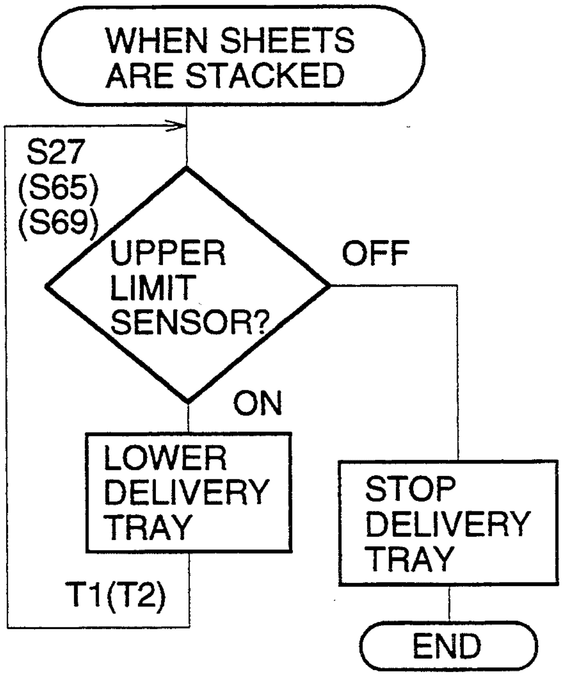
Figure 18:
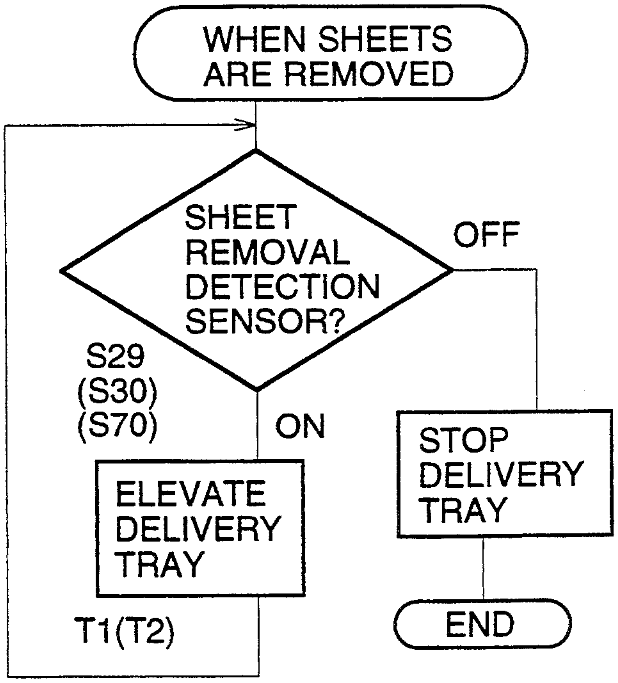
Figure 19:
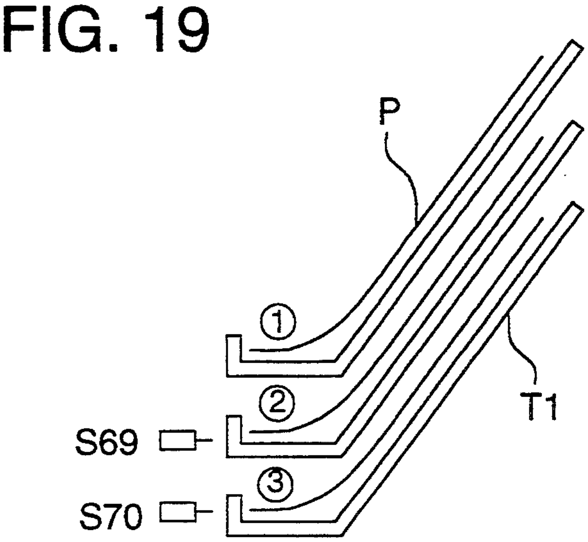
FIG. 19 is an illustration showing the elevation control of the delivery tray.

FIGS. 18(*a*)–18(*c*) are flow charts showing the elevation control operation of the delivery tray when the recording sheets are stacked on the tray, and when the recording sheets of the upper layer are removed while the recording sheets are being stacked on the tray, in the recording sheet finishing processing apparatus 400. FIG. 19 is an illustration showing the positions of the delivery trays T1, T2, the upper limit sensor S69, and the sheet removal detection sensor S70. In this connection, operations of the delivery tray for stapling and the delivery tray for offset processing are conducted in the same upper tray T1. Further, since three kinds of delivery operations of the offset sheet delivery, stapler upper tray sheet delivery, and .stapler lower tray sheet delivery, are conducted by the same elevating operation, the example will be explained with respect to the offset delivery operation hereinafter.

(1) An initializing operation . . . When the uppermost portion of the recording sheet P on the delivery tray T1 is located at $P_1$, or $P_2$ shown in FIG. 19, the delivery tray T1 is lowered until the sheet removal detection sensor S70 is turned off, and positioned at $P_3$. When the delivery tray T1 is located at $P_3$, or lowered from $P_3$, the delivery tray T1 is raised and moved until the sheet removal detection sensor S70 is turned on, and stopped at a predetermined position $P_2$ (refer to FIG. 18(A)).

(2) A recording sheet stacking operation . . . When the recording sheet P is located at $P_1$ on the delivery tray T1, and the upper limit detection sensor S69 is turned on, the delivery tray T1 is lowered. When the upper limit sensor S69 is turned off, movement of the delivery tray T1 is stopped, and the delivery tray T1 is located at a predetermined position $P_2$ (refer to FIG. 18(*b*)).

(3) Sheet removal operation . . . When a part of the recording sheet P is removed and thus the uppermost portion of the recording sheet P on the delivery tray T1 is located at $P_3$, the delivery tray T1 is raised to a predetermined position $P_2$ until the sheet removal detection sensor S70 is turned on, and stopped (refer to FIG. 18(C).

Since the removal detecting operation of the recording sheet stacked on the delivery tray and the initialized position detecting operation are carried out by the same sensor S29 (S30), it is advantageous to the production cost reduction. Further, since the high accuracy is required for the initial position detection means and the stacking amount detection means, it takes a lot of time for mounting and adjusting sensors. The time for the foregoing operations can be greatly reduced by the present invention.

In the example, although the apparatus according to the present invention is connected to a copier, the apparatus can also be connected to an image forming apparatus, such as a printer, and a facsimile.

According to the present invention, a recording sheet finishing processing apparatus can be provided in which a plurality of recording sheets can be highly efficiently collated and stapled for each volume at a high speed.

What is claimed is:

1. A recording sheet finishing apparatus connected with an image forming apparatus, which staples recording sheets discharged from said image forming apparatus and ejects the stapled recording sheets, said recording sheet finishing apparatus comprising:

a rotatable belt for receiving and conveying stapled recording sheets, said belt having a protrusion thereon;

an exit tray for receiving the recording sheets conveyed by said belt;

a detector for detecting a position of said protrusion provided on said belt after said belt has conveyed the stapled recording sheets, whereby an initial position of said belt at which a stapling operation is conducted can be set; and control means for sequentially switching over conveyance speed of said belt to a first speed when said belt receives the recording sheets which have been stapled, to a second speed when a predetermined period of time has passed, and to a third speed when the recording sheets are separated from said belt, and wherein said first and said third speeds are slower than said second speed.

2. The recording sheet finishing apparatus of claim 1, further comprising:

a plurality of stackers for stacking recording sheets discharged from said image forming apparatus;

a plurality of staplers, each stapler provided on each of said plurality of stackers, respectively, for stapling the stacked recording sheets; and a plurality of discharge trays, each being arranged in accordance with each of said plurality of stackers for stacking the stapled recording sheets, and wherein said control means further controls said plurality of staplers to alternately staple each set of recording sheets stacked in said plurality of stackers, and to eject said each set of the stapled recording sheets so as to be pushed to said discharge tray in a direction away from each of said plurality of staplers.

* * * * *